UNITED STATES PATENT OFFICE.

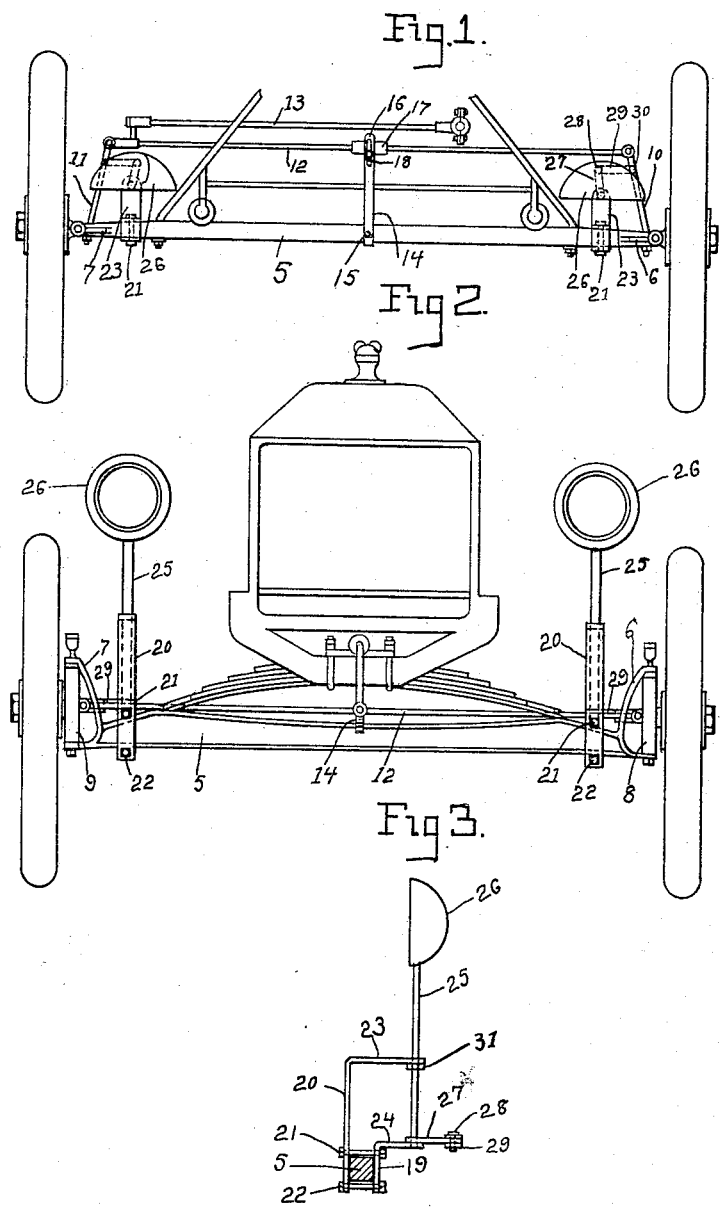

ROBERT L. HARRIS AND ELI M. GEESLIN, OF CARADAN, TEXAS.

DIRIGIBLE HEADLIGHT.

1,279,864. Specification of Letters Patent. Patented Sept. 24, 1918.

Application filed November 17, 1917. Serial No. 202,527.

*To all whom it may concern:*

Be it known that we, ROBERT L. HARRIS and ELI M. GEESLIN, citizens of the United States, residing at Caradan, in the county of Mills and State of Texas, have invented certain new and useful Improvements in Dirigible Headlights, of which the following is a specification.

This invention is a dirigible headlight that is more particularly adapted for use upon automobiles or self-propelled vehicles, wherein the usual headlights are directed to throw their beams of light in the direction of travel upon the actuating of the steering mechanism.

One object of the invention is to provide an actuating mechanism for directing the headlight lamps through suitable connections connected with the steering knuckles.

Another object is to provide a bracket composed of two spaced L-shaped members that are adapted to be secured to the front axle, said members being apertured to rotatably receive the supporting stem or standard for the lamps.

Still another object is to provide a support having a bearing at one end through which one of the levers serving as a tie bar, is adapted to pass.

A further object of the invention is to provide two links pivotally connected together with one of the links attached to the rotatable lamp support, while the end of the other link is connected to the steering arm.

Broadly stated the invention comprises a bracket formed of two apertured spaced L-shaped members serving as spaced bearings for a rotatable lamp stem or supporting standard, said brackets being spaced from each other and attached to the front axle, a connection between the lower end of the lamp stem and the steering arm of the steering knuckle, said connection including links pivotally connected together, and a support having a bearing through which passes the tie bar of the steering mechanism, said support being secured to the front axle at a point intermediate of its ends and between the steering knuckle, and to provide for movement of the bar, said support being slotted to provide for slidably securing the bearing thereto.

One practical form of construction and assembly on a vehicle will be described and illustrated in the accompanying drawings, in which:—

Figure 1 is a top plan view of the device as employed upon the front axle of an automobile, Fig. 2 is a front elevation of the device as attached to the front axle of an automobile, and Fig. 3 is a detail elevation showing the lamp stem and one of the brackets for holding the stem.

In the preferred embodiment about to be described the front axle may be generally indicated at 5 and is provided at each end with the usual steering yokes 6 and 7. Rotatably secured within these yokes are the steering knuckles 8 and 9. The knuckle 8 is provided with a steering arm 10, and the knuckle 9 is provided with the steering arm 11. Each end of the steering arms 10 and 11 are so constructed that a tie bar 12 may be connected thereto. The usual drag link 13 may be connected to the tie bar as is usual in steering mechanism construction.

The front axle 5 may have connected thereto at a suitable point a support 14 as shown more particularly in Fig. 1. The support may be secured to the front axle in any usual or customary way or in the present illustration a screw 15 is shown as being a fastening means. The outer or free end of the support is provided with an elongated slot 16. The slot extends longitudinally of the support and terminates adjacent one end of the support 14.

The tie bar 12 is adapted to pass through a bearing 17 that is suitably connected with the support 14. Any usual means may be employed to provide this connection but in the present instance it is shown as a headed bolt 18 passing through the slot 16. The tie bar 12 is then adapted to slide through the bearing 17 and by means of the connection afforded by the bolt 18 the bearing is adapted to slide longitudinally of the support. This will take care of the motion of the tie bar and also serve as a support therefor.

The front axle 5 is adapted to have mounted thereon and secured thereto, two brackets. These brackets are each formed of two L-shaped members as shown more particularly in Fig. 3. These L-shaped members are preferably of different sizes in the lengths of their limbs or portions. As shown in Fig. 3 they are employed in an inverted position. The vertical limbs 19 and 20 are each provided with suitable holes through which pass the bolts 21 and 22. These bolts 21 and 22 serve to secure the two L-shaped members on the rear axle adjacent the steering yoke ends.

The transverse portions 23 and 24 are also provided with holes adjacent their outer ends and these holes are preferably in alinement when the assembled bracket is secured upon the front axle 5. These holes serve as bearings for a rotatable stem or supporting standard 25 which carries at its upper end a lamp 26. The stem 25 passes through the transverse portions 23 and 24 as shown more particularly in Fig. 3. The lamp 26 may be of any usual headlight type as commonly employed upon automobiles.

Connected with the stem 25 is a link 27 which as shown in Fig. 3 is preferably secured above the transverse portion 24 of the lower L-shaped member of the bracket. This link 27 may be permanently secured to the stem 25 in any usual manner or a set screw may be employed to retain the link in a predetermined position upon the stem 25. The other end of the link 27 has a hole therethrough to provide for a pivotal connection 28 with another link 29. The other end of the link 29 is provided with a hole so that it may have pivotal connection at 30 with the steering arm.

As the construction of the bracket and its placing and the two links and their connections are similar only one has been described in detail. The stem 25, if desired, may have secured thereto a collar 31 so as to more effectively retain the stem in its proper position.

The stems 25, from the construction outlined, are thus shown to be positively connected with the steering arms carried by the steering knuckle. Any movement of the steering arms tending to change the direction of travel of the road wheels will cause a corresponding movement of the lamps 26. The pivotal connection 28 between the links 27 and 29 will take care of the change of position of the steering arms as influenced by the steering mechanism. It will thus be seen that the lamps are always caused to point in the direction that the road wheels are caused to take.

If desired the link connection upon one side may be disconnected and the lamp retained in the stationary position so as to point directly ahead and not be changed by the change of direction caused by steering. At the same time the other lamp being connected with the steering arm will illuminate for each change of direction of travel. The device as constructed consists of few parts that are simple and strong in construction and the assembly is one that may be readily attached to an automobile with little trouble. As the parts are relatively few in number and of simple design which makes for cheapness in manufacture the assembly is not liable to disarrangement or injury through use.

What is claimed is:—

A dirigible headlight for automobiles, which comprises a lamp bracket attached to the front axle, said bracket consisting of two inverted L-shaped members, the transverse portions of which are spaced apart vertically and provided with alined bearings near the outer ends thereof, the vertical portions of said members being mounted and secured upon opposite sides of the axle which then serves as a spacing member, a vertical lamp stem rotatably mounted in the bearings of the bracket members, and pivotally connected links, the other ends of the links being connected, respectively, to the lamp stem and to the steering arm of the steering knuckle.

In testimony whereof they affix their signatures in presence of two witnesses.

ROBERT L. HARRIS,
ELI M. GEESLIN.

Witnesses:
PAUL DAVIS,
J. B. HUCKABEE.

Copies of this patent may be obtained for five cents each, by addressing the "Commissioner of Patents, Washington, D. C."